(12) United States Patent
Lai et al.

(10) Patent No.: US 11,614,375 B2
(45) Date of Patent: Mar. 28, 2023

(54) ELECTROMECHANICAL SENSOR, A METHOD OF PRODUCING SUCH SENSOR AND A WEARABLE DEVICE INCLUDING SUCH SENSOR

(71) Applicant: City University of Hong Kong, Kowloon (HK)

(72) Inventors: King Wai Chiu Lai, Kowloon Tong (HK); Xiaoting Li, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 535 days.

(21) Appl. No.: 16/720,208

(22) Filed: Dec. 19, 2019

(65) Prior Publication Data

US 2021/0190614 A1    Jun. 24, 2021

(51) Int. Cl.
*G01L 9/00*    (2006.01)
*G01L 1/22*    (2006.01)

(52) U.S. Cl.
CPC .......... *G01L 9/0027* (2013.01); *G01L 1/2287* (2013.01)

(58) Field of Classification Search
CPC .................. G01L 9/0027; G01L 1/2287
See application file for complete search history.

(56) References Cited

U.S. PATENT DOCUMENTS

| 2,457,616 | A | * | 12/1948 | Dennis | G01L 1/2287 |
| | | | | | 428/572 |
| 4,862,146 | A | * | 8/1989 | McCoy | G08B 21/20 |
| | | | | | 174/11 R |
| 5,835,027 | A | * | 11/1998 | Tyburski | G08G 1/02 |
| | | | | | 340/941 |
| 7,554,045 | B2 | * | 6/2009 | Sandbach | G01L 1/20 |
| | | | | | 200/61.43 |
| 9,168,094 | B2 | * | 10/2015 | Lee | A61B 18/1492 |
| 11,266,433 | B2 | * | 3/2022 | Robertson | A61B 17/3205 |
| 2002/0088931 | A1 | * | 7/2002 | Danisch | G01D 5/268 |
| | | | | | 250/227.14 |

(Continued)

FOREIGN PATENT DOCUMENTS

CN    101728005 A    6/2010
CN    105783697 A    7/2016

(Continued)

OTHER PUBLICATIONS

Gao, W.; Emaminejad, S.; Nyein, H. Y. Y.; Challa, S.; Chen, K. V.; Peck, A.; Fahad, H. M.; Ota, H.; Shiraki, H.; Kiriya, D.; Lien, D. H.; Brooks, G. A.; Davis, R. W.; Javey, A. Fully Integrated Wearable Sensor Arrays for Multiplexed in Situ Perspiration Analysis. Nature 2016, 529, 509-5 14.

(Continued)

*Primary Examiner* — Max H Noori
*Assistant Examiner* — Masoud H Noori
(74) *Attorney, Agent, or Firm* — Renner Kenner Greive Bobak Taylor & Weber

(57) ABSTRACT

An electromechanical sensor includes: an elastic carrier arranged to extend when subjected to an external mechanical load; a sensing sheath arranged at least partially around and along the elastic carrier; wherein the sensing sheath includes (Continued)

an electrically resistive element having a first electrical resistance operable to change upon a change of a dimension of the elastic carrier.

32 Claims, 10 Drawing Sheets

(56) References Cited

U.S. PATENT DOCUMENTS

| | | | | |
|---|---|---|---|---|
| 2004/0108854 | A1* | 6/2004 | Nichols | G01V 3/083 |
| | | | | 324/350 |
| 2005/0085693 | A1* | 4/2005 | Belson | A61B 1/0055 |
| | | | | 600/114 |
| 2006/0117862 | A1* | 6/2006 | Shank | E05F 15/46 |
| | | | | 73/780 |
| 2010/0105992 | A1 | 4/2010 | Oda et al. | |
| 2011/0047879 | A1* | 3/2011 | Shimizu | E05F 15/70 |
| | | | | 49/358 |
| 2017/0052270 | A1* | 2/2017 | Schatz | G01V 3/04 |
| 2017/0203440 | A1* | 7/2017 | Koselka | B25J 9/1694 |
| 2018/0303383 | A1* | 10/2018 | Connor | G06F 3/014 |
| 2019/0096540 | A1* | 3/2019 | Baughman | H01B 1/24 |
| 2020/0063296 | A1* | 2/2020 | Ozden | D02G 3/12 |
| 2022/0033998 | A1* | 2/2022 | Wetzel | B29D 11/00701 |
| 2022/0111212 | A1* | 4/2022 | Howard | A61B 5/686 |
| 2022/0118258 | A1* | 4/2022 | Howard | A61N 1/36103 |
| 2022/0196492 | A1* | 6/2022 | Burghoorn | G01L 1/2287 |

FOREIGN PATENT DOCUMENTS

| | | |
|---|---|---|
| CN | 108267078 A | 7/2018 |
| CN | 106705829 B | 6/2019 |
| WO | 2016186281 A1 | 9/2012 |
| WO | 2012126960 A1 | 7/2018 |

OTHER PUBLICATIONS

Rogers, J. A.; Someya, T.; Huang, Y. Materials and Mechanics for Stretchable Electronics. Science 2010, 327, 1603-1607.

Trung, T. Q.; Lee, N.-E. Flexible and Stretchable Physical Sensor Integrated Platfonns for Wearable Human-Activity Monitoring and Personal Healthcare. Adv Mater. 2016, 28, 4338.

Yamada, T.; Hayamizu, Y.; Yamamoto, Y.; Yomogida, Y.; IzadiNajafabadi, A.; Futaba, D. N.; Hata, K. A Stretchable Carbon Nanotube Strain Sensor for HumanMotion Detection. Nat. Nanotechnol. 20 I I, 6, 296-301.

Park, M.; Im, J.; Shin, M.; Min, Y.; Park, J.; Cho, H.; Park, S.; Shim, M.-B.; Jeon, S.; Chung, D.-Y.; Bae, J.; Park, J.; Jeong, U.; Kim, K. Highly Stretchable Electric Circuits from a Composite Material of Silver Nanoparticles and Elastomeric Fibres. Nat. Nanotechnol. 2012, 7, 803-809.

Matsuhisa, N.; Kaltenbrunner, M.; Yokota, T.; Jinno, H.; Kurihara, K.; Sekitani, T.; Someya, T. Printable Elastic Conductors with a High Conductivity for Electronic Textile Applications. Nat. Commun. 2015, 6, 7461.

Trung, T. Q.; Lee, N.-E. Recent Progress on Stretchable Electronic Devices with Intrinsically Stretchable Components. Adv. Mater. 2017,29, 1603167.

Son, D.; Lee, J.; Qiao, S.; Ghaffari, R.; Kim, J.; Lee, J. E.; Song, C.; Kim, S. J.; Lee, D. J.; Jun, S. W.; Yang, S.; Park, M.; Shin, J.; Do, K.; Lee, M.; Kang, K.; Hwang, C. S.; Lu, N.; Hyeon, T.; Kim, D.-H. Multifunctional Wearable Devices for Diagnosis and Therapy of Movement Disorders. Nat. Nanotechnol. 2014, 9, 397-404.

Yeo, W.-H.; Kim, Y.-S.; Lee, J.; Ameen, A.; Shi, L.; Li, M.; Wang, S.; Ma, R.; Jin, S. H.; Kang, Z.; Huang, Y.; Rogers, J. A. Multifunctional Epidermal Electronics Printed Directly Onto the Skin. Adv. Mater. 2013, 25, 2773-2778.

Segev-Bar, M.; Haick, H. Flexible Sensors Based on Nanoparticles. ACS Nano 2013, 7, 8366-8378.

Zhang, Z.; Guo, K.; Li, Y.; Li, X.; Guan, G.; Li, H.; Luo, Y.; Zhao, F.; Zhang, Q.; Wei, B.; Pei, Q.; Peng, H. A Colour-Tunable, Weavable Fibre-Shaped Polymer Light-Emitting Electrochemical Cell. Nat. Photonics 201 5, 9, 233.

Sekitani, T.; Someya, T. Stretchable, Large-Area Organic Electronics. Adv. Mater. 2010, 22, 2228-2246.

Sekitani, T.; Nakajima, H.; Maeda, H.; Fukushima, T.; Aida, T.; Hata, K.; Someya, T. Stretchable Active-Matrix Organic Light-Emitting Diode Display Using Printable Elastic Conductors Nat Mater 2009, 8, 494-499.

Lee, J.; Kwon, H.; Seo, J.; Shin, S.; Koo, J. H.; Pang, C.; Son, S.; Kim, J. H.; Jang, Y. H.; Kim, D. E.; Lee, T. Conductive Fiber-Based Ultrasensitive Textile Pressure Sensor for Wearable Electronics. Adv. Mater. 2015, 27,2409.

S. Ryu, P. Lee, J. B. Chou, R. Xu, R. Zhao, A. J. Hart, S.-G. Kim, ACS Nano 2015, 9, 5929.

C. Wang, X. Li, E. Gao, M. Jian, K. Xia, Q. Wang, Z. Xu, T. Ren, Y. Zhang, Adv. Mater. 2016, 28, 6640.

Cheng, Y.; Wang, R.; Sun, J.; Gao, L. A Stretchable and Highly Sensitive Graphene-Based Fiber for Sensing Tensile Strain, Bending, and Torsion. Adv. Mater. 2015, 27, 7365-7371.

Boland, C. S.; Khan, U.; Backes, C.; O'Neill, A.; McCauley, J.; Duane, S.; Shanker, R.; Liu, Y.; Jurewicz, 1.; Dalton, A. B.; Coleman, J. N. Sensitive, High-Strain, High-Rate Bodily Motion Sensors Based on Graphene-Rubber Composites. ACS Nano 2014, 8, 8819-8830.

Waterproof, Ultrahigh Areal-Capacitance, Wearable Supercapacitor Fabrics Yu Yang, Qiyao Huang, Liyong Niu, Dongrui Wang, Casey Y an, Yiyi She, and Zijian Zheng, Adv. Mater. 2017, 29, 1606679.

Cheng, Y.; Wang, R.; Sun, J.; Gao, L. Highly Conductive and Ultrastretchable Electric Circuits from Covered Yarns and Silver Nanowires. ACS Nano 2015, 9, 3887-3895.

S. Gong, W. Cheng, Adv. Electron. Mater. 2017, 3, 1600314.

S. Yao, P. Swetha, Y. Zhu, Adv. Healthcare Mater. 2018,7, 1700889.

K. Chen, W. Gao, S. Emaminejad, D. Kiriya, H. Ota, H. Y. Y. Nyein, K. Takei, A. Javey, Adv. Mater. 2016,28, 4397.

H. Jang, Y. J. Park, X. Chen, T. Das, M.-S. Kim, J.-H. Ahn, Adv. Mater. 2016,28, 4184.

J. J. Park, W. J. Hyun, S. C. Mun, Y. T. Park, 0. 0. Park, ACS Appl. Mater. Interfaces2015, 7, 6317.

J. Lee, S. Shin, S. Lee, J. Song, S. Kang, H. Han, S. G. Kim, S. Kim, J. Seo, D. E. Kim, T. Lee, ACS Nano 2018, 12,4259.

Su, C. I.; Maa, M. C.; Yang, H. Y. Structure and performance of elastic core-spun yarn. Text. Res. J. 2004, 74, 607-610.

Bhowmick, A. K.; Stephens, H. L. Polynorbomene rubber. In Handbook of Elastomers; Marcel Dekker Inc.: New Y ark, 2001.

Serizawa, T.; Kamimura, S.; Kawanishi, N.; Akashi, M. Layerbylayer assembly of poly(vinyl alcohol) and hydrophobic polymers based on their physical adsorption on surfaces. Langmuir 2002, 18, 8381-8385.

Tian, H.; Shu, Y.; Cui, Y. L.; Mi, M. T.; Yang, Y.; Xie, D.; Ren, T.-L. Scalable fabrication of high-performance and flexible graphene strain sensors Nanoscale 2014, 6, 699-705.

Balima, F.; Le Floch, S.; Adessi, C.; Cerqueira, T. F. T.; Blanchard, N.; Arenal, R.; BrGiet, A.; Marques, M. A. L. ; Botti, S.; San-Miguel, A. Radial collapse of carbon nanotubes for conductivity optimized polymer composites. Carbon 2016, 106, 64-73.

Xiaoting Li, Haibo Hu, Tao Hua, Bingang Xu, Shouxiang Jiang, "Wearable strain sensing textile based on one-dimensional stetchable and weavable yarn sensors," Nano Research 2018, 11(11): 5799-5811.

J. H. Lee, D. Yang, S. Kim and I. Park, "Stretchable strain sensor based on metal nanoparticle thin film for human motion detection & flexible pressure sensing devices," 2013 Transducers & Eurosensors XXVII: The 17th International Conference on Solid-State Sensors, Actuators and Microsystems (Transducers & Eurosensors XXVII), 2013, pp. 2624-2627.

* cited by examiner

ELECTROMECHANICAL SENSOR, A METHOD OF PRODUCING SUCH SENSOR AND A WEARABLE DEVICE INCLUDING SUCH SENSOR

TECHNICAL FIELD

The present invention relates to an electromechanical sensor, a method of producing such sensor and a wearable device including such sensor, and particularly, although not exclusively, to yarn-based sensor for wearable devices.

BACKGROUND

With portable electronics becoming more popular, some of the electronic devices may now be produced in a wearable form factor as "wearable devices". For example, smart waist bands may be worn to provide information to a user including but not limited to heartbeat rate, and body temperature.

In some example wearable devices, different types of sensors may be provided in a solid housing of the devices and the entire housing is further engaged to the user using different engagement means. The engagement means includes straps or simply sticky gels for engaging the device to a skin surface of the user. Alternatively, the housing may be integrated in a relatively large piece of garment product for example by hiding it in a closed pocket formed in such garment product.

SUMMARY OF THE INVENTION

In accordance with a first aspect of the present invention, there is provided an electromechanical sensor comprising: an elastic carrier arranged to extend when subjected to an external mechanical load; a sensing sheath arranged at least partially around and along the elastic carrier; wherein the sensing sheath includes an electrically resistive element having a first electrical resistance operable to change upon a change of a dimension of the elastic carrier.

In an embodiment of the first aspect, a change of the electrical resistance represents mechanical strain subjected by the electromechanical sensor.

In an embodiment of the first aspect, the elastic carrier includes an elongated shape.

In an embodiment of the first aspect, the elastic carrier includes one or more yarns or filaments.

In an embodiment of the first aspect, the elastic carrier is further arrange to retract upon a release of at least a portion of the external mechanical load.

In an embodiment of the first aspect, the elastic carrier includes a first polymer.

In an embodiment of the first aspect, the elastic carrier includes polyurethane.

In an embodiment of the first aspect, the elastic carrier is an electrical insulator.

In an embodiment of the first aspect, the electrically resistive element comprises an electrical conductive material and a plurality of cracks distributed along the electrical conductive material; wherein the plurality of cracks are operable between an opening state and a closing state.

In an embodiment of the first aspect, when the elastic carrier extends with an increasing of the external mechanical load subjected by the elastic carrier, the number of cracks operating in the opening state increases, thereby increasing the first electrical resistance of the electrically resistive element.

In an embodiment of the first aspect, the electrically resistive element includes graphene.

In an embodiment of the first aspect, the electrically resistive element includes multiple layers of graphene.

In an embodiment of the first aspect, the sensor further comprises at least one intermediate layers disposed between the elastic carrier and the sensing sheath.

In an embodiment of the first aspect, the at least one intermediate layers includes a conductive base layer arranged to maintain an electrical conductivity of the electromechanical sensor.

In an embodiment of the first aspect, the conductive base layer includes a second electrical resistance operable to change upon a change of a dimension of the elastic carrier.

In an embodiment of the first aspect, the conductive base layer includes at least one layer of graphene.

In an embodiment of the first aspect, the at least one intermediate layers further includes a buffer layer disposed between the conductive base layer and the sensing sheath.

In an embodiment of the first aspect, the buffer layer is arranged to facilitate sliding movement of the sensing sheath with respect to the conductive base layer and/or the elastic carrier.

In an embodiment of the first aspect, the buffer layer is arranged to reduce a friction between the sensing sheath and the conductive base layer, and/or to adjust partial stress applied on the sensing sheath during operation of the electromechanical sensor.

In an embodiment of the first aspect, the buffer layer is arranged to maintain the electrical conductivity of the electromechanical sensor.

In an embodiment of the first aspect, the buffer layer includes gold.

In an embodiment of the first aspect, the sensor further comprises an encapsulation arranged to protect the elastic carrier and the sensing sheath.

In an embodiment of the first aspect, the encapsulation is substantially waterproof.

In an embodiment of the first aspect, the encapsulation is substantially biocompatible.

In an embodiment of the first aspect, the encapsulation includes a second polymer.

In an embodiment of the first aspect, the encapsulation includes polydimethylsiloxane.

In an embodiment of the first aspect, a portion of the encapsulation infiltrates into cracks on the electrically resistive element on the sensing sheath.

In an embodiment of the first aspect, the encapsulation is further arrange to facilitate a retraction of the elastic carrier upon a release of at least a portion of the external mechanical load.

In accordance with a second aspect of the present invention, there is provided a wearable electronic device comprising the electromechanical sensor in accordance with the first aspect, wherein the electromechanical sensor forms a portion of a fabric component of the wearable electronic device.

In accordance with a third aspect of the present invention, there is provided a method of producing a electromechanical sensor, comprising the step of providing a sensing sheath on an elastic carrier by coating an electrically resistive element on a surface of the elastic carrier; wherein the elastic carrier is arranged to extend when subjected to an external mechanical load; wherein the sensing sheath is at least partially around and along the elastic carrier; and wherein the electrically resistive element has a first electrical resistance operable to change upon a change of a dimension of the elastic carrier.

In an embodiment of the third aspect, the step of coating the electrically resistive element on the surface of the elastic carrier includes immersing the elastic carrier into a graphene dispersion for a predetermined period of time.

In an embodiment of the third aspect, the elastic carrier includes polyurethane, and the elastic carrier is coated with polyvinyl alcohol prior to the coating of the electrically resistive element thereon.

In an embodiment of the third aspect, the method further comprises the steps of repeating the step of immersing the elastic carrier into the graphene dispersion after air drying of the graphene coatings to obtain multiple layers of graphene coatings in the sensing sheath.

In an embodiment of the third aspect, the method further comprises the step of providing at least one intermediate layers between the elastic carrier and the sensing sheath.

In an embodiment of the third aspect, prior to the step of providing the sensing sheath on the elastic carrier, further comprising the step of coating a conductive base layer on the elastic carrier; wherein the conductive base layer is arranged to maintain an electrical conductivity of the electromechanical sensor.

In an embodiment of the third aspect, the step of coating the conductive base layer on the elastic carrier includes immersing the elastic carrier into a graphene dispersion for a predetermined period of time, and optionally repeating the step of immersing the elastic carrier into the graphene dispersion after air drying of the graphene coatings to obtain multiple layers of graphene coatings in the conductive base layer.

In an embodiment of the third aspect, the method further comprises the step of coating a buffer layer on the conductive base layer, wherein the buffer layer is arranged to facilitate sliding movement of the sensing sheath with respect to the conductive base layer and/or the elastic carrier.

In an embodiment of the third aspect, the step of coating a buffer layer on the conductive base layer includes sputtering gold on a surface of the conductive base layer.

In an embodiment of the third aspect, the method further comprises the steps of encapsulating the sensing sheath and the elastic carrier by coating an encapsulation on a surface of the sensing sheath.

In an embodiment of the third aspect, the step of coating the encapsulation on the surface of the sensing sheath includes the step of dipping the elastic carrier coated with the electrically resistive element in PDMS solution for a predetermined period of time.

In an embodiment of the third aspect, the method further comprises the step of weaving a fabric component with the elastic carrier coated with the electrically resistive element, wherein the elastic carrier includes one or more yarns or filaments.

BRIEF DESCRIPTION OF THE DRAWINGS

Embodiments of the present invention will now be described, by way of example, with reference to the accompanying drawings in which.

DETAILED DESCRIPTION

The inventors have, through their own research, trials and experiments, devised that flexible, stretchable and wearable electronics may be used in various applications such as healthcare monitoring systems, electronic skins, and soft robotics. Some of the wearable electronics may include a planar structure, which limit them from being integrated onto non-planar materials or woven into textiles or garments, thus hindering their practical applications in wearable electronics.

Without wishing to be bound by theory, to achieve superior flexibility, stretchability, and wearability of the wearable electronics, superelastic textiles, including fibers, yarns, and fabrics may be used as substrates to fabricate wearable electronics. Preferably, different forms of textile-based (fiber-/yarn-/fabric-based) wearable electronics, including sensors, supercapacitors, electrical conductors, light-emitting electronics, etc. may be fabricated.

In one example embodiment, textile-based strain sensors may be used for monitoring diverse human motions by integrating them onto different non-planar objects or sewed/woven into fabrics/clothing.

Figure 1:
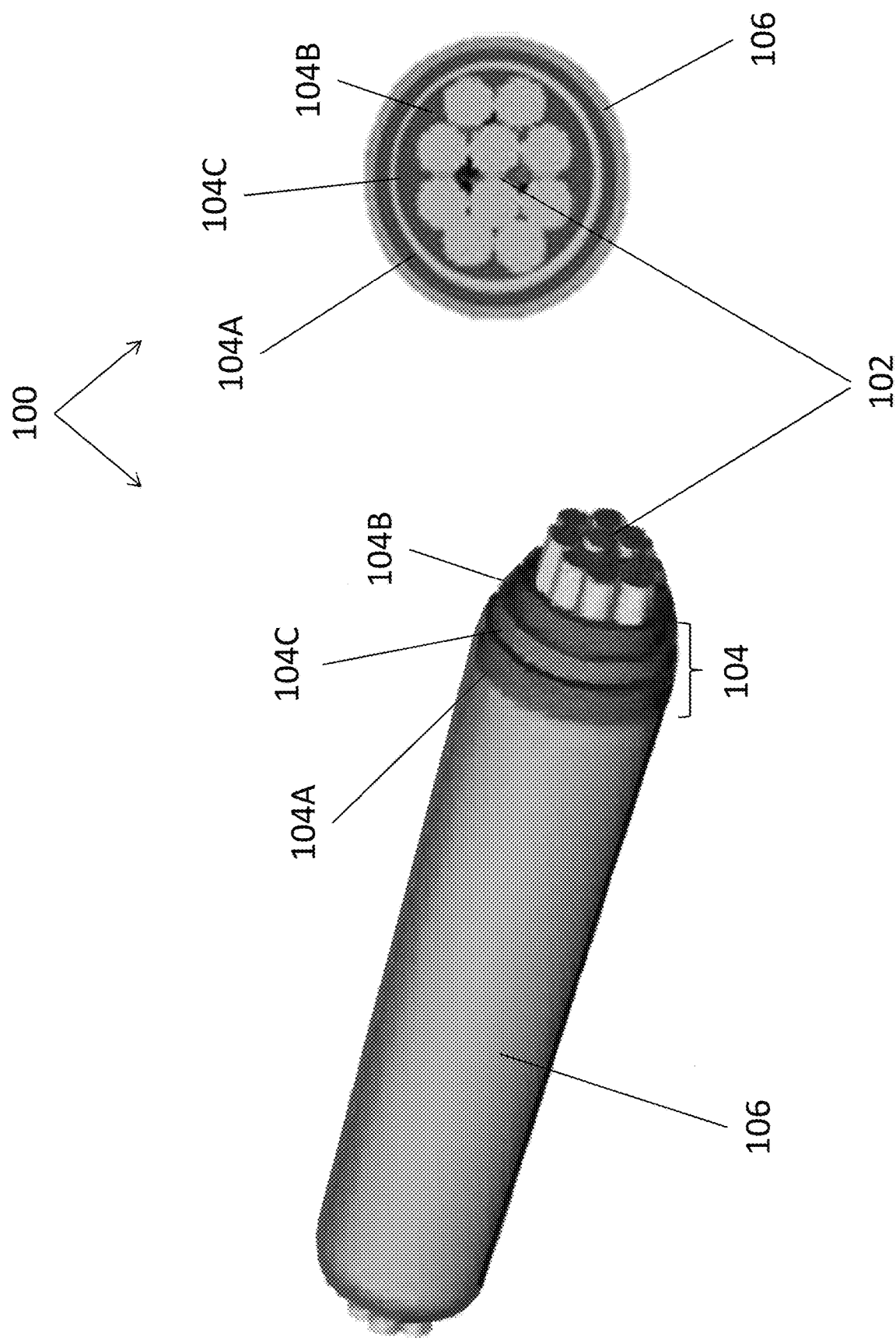
FIGS. 1A and 1B are perspective view and a cross-sectional view an electromechanical sensor in accordance with an embodiment of the present invention.

With reference to FIGS. 1A and 1B, there is shown an embodiment of an electromechanical sensor 100 comprising: an elastic carrier 102 arranged to extend when subjected to an external mechanical load; and a sensing sheath 104 arranged at least partially around and along the elastic carrier; wherein the sensing sheath 104 includes an electrically resistive element having a first electrical resistance operable to change upon a change of a dimension of the elastic carrier 102.

In this embodiment, the electromechanical sensor 100 may be integrated as a part of a wearable item, for example by woven as a fabric component of the wearable item. For example, textile-based strain sensors may be used for monitoring diverse human motions by integrating them onto different non-planar objects or sewed/woven into fabrics/clothing.

Referring to FIGS. 1A and 1B, the sensor 100 comprises a core 102 which has an elongated shape, therefore may be used as yarn or filiments. The core 102 may be elastic and flexible such that the sensor 100 is stretchable and may extend when subjected to an external mechanical load, e.g. pulling forces applied at two distanced ends of the sensor 100. The core 102 may be used as an elastic carrier 102 which has one or more layers of material coated thereon.

Preferably, the elastic carrier 102 is made of a polymer such as polyurethane (PU). PU is elastic such that the carrier extents when being pulled and retracts upon a release of the pulling force or at least a portion of the external mechanical load.

Alternatively, the elastic carrier 102 may be made of other textile/fabric materials, such as but not limited to Ecoflex material, rubber, stretchable fiber and silk fibre.

On the surface of the core 102 or the carrier, electrically conductive material may be deposited thereon such that the electrically insulating PU yarn is electrically conductive. In addition, this electrically conductive material is also preferably to be electrically resistive and has an electrical resistance being variable based on a change of a dimension, such as the length, of the PU core.

Preferably, since the electrically conductive coating has a variable electrical resistance changing based on the extendable/retractable length of the entire yarn-based sensor 100, the change of the electrical resistance may represent mechanical strain subjected by the electromechanical sensor 100.

Referring to FIGS. 1A and 1B, the electrically conductive material 104A substantially wraps around the entire surface of the PU core 102, and define the sensing sheath 104 which responses electrically. Alternatively, the sensing sheath 104 may only partially wrap around the core.

Preferably, the sensing sheath 104 includes an electrically resistive element formed by the electrically conductive material 104A and a plurality of (micro-)cracks distributed along the electrical conductive material 104A; wherein the plurality of cracks are operable between an opening state and a closing state. By increasing the number of opening cracks along the conductive coating 104A, the overall resistance of the entire sheath also increases, for example when upon the elastic core 102 is lengthened. In contrast, when the extended length is retracted, the cracks close and therefore the overall resistance is than lowered. The increase of number of opening cracks may also considered as an increase of crack propagation along the layer of electrically conductive material 104A In one preferable example, the electrically conductive/resistive element includes graphene, and more preferably, includes multiple layers of graphene or graphene nanosheets (GNSs). Alternatively, other conductive materials such as carbon nanotubes (CNTs), graphene nanoplatelets, metal nanoparticles, and carbonizing materials may be used.

For example, CNT/Ecoflex strain sensor may be fabricated using dry-spun CNT fibres and Ecoflex, in which the strain sensor could be stretched to 900%. It was observed that the GF is up to 0.54 in the working range of 0-400%, which may not be suitable for detecting tiny human motions induced by phonation, respiration, pulse, heart beat and muscle movement.

In another example, another strain sensor may be fabricated by coating graphene nanoplatelets onto rubber yarn, which was found to have a working range of 0-150% with the GF of 1.4.

In another exemplary strain sensor, an Ag nanoparticles-coated stretchable fiber strain sensor has a high GF of 450 at 200%, which is good in terms of wearability, high stretchability, and wide strain-sensing range and relative high sensitivity simultaneously. However, this sensor may only be long-term and stable used under 10% strain (10000 stretching-releasing cycles).

In yet another example, a carbonized silk fabric-based strain sensor shows a good sensitivity (GF value of 37.5), high stretchability (500%), and good stability under 100% (6000 stretching-releasing cycles). However, for better applications in full-range human motion detection, its sensitivity and stability may need to be further improved.

The inventors devised that textile-based sensor such as strain sensors such as those being discussed above using conductive materials as strain-sensing materials and stretchable polymeric textiles (fiber, yarn, and fabric) as supporting substrate materials.

The strain-sensing materials may include advanced carbon-type materials such as graphene, carbon nanotubes (CNTs), and graphite, and/or metal nanomaterials like gold (Au), silver (Ag), and copper (Cu).

In these example materials, advanced carbon-type materials which composed of sp2-bonded carbon atoms formed honeycomb-like crystal lattice structure, possess outstanding electrical conductivity, good thermal and chemical stability, as well as superior mechanical property, thus endowing them to be applied in wearable electronics. Alternatively, metal nanomaterials also possess high electrical conductivity, and outstanding thermal and chemical stability which largely facilitate their practical application in wearable electronics.

Optionally, the electromechanical sensor may further comprise at least one intermediate layers disposed between the elastic carrier 102 and the sensing sheath 104. Referring to FIGS. 1A and 1B, two additional layers including an (inner) conductive base layer 104B and a buffer layer 104C are sandwiched between the core 102 and the (outer) graphene layer 104A. These three layers (104A, 104B and 104C) may be considered as combining to define the sensing sheath 104 which is electrically responsive to a mechanical load applied to the yarn-based core 102 wrapped therein. For example, the three layers (104A, 104B and 104C) combine to form a multilayer GNSs/Au/GNSs-sheath 104 wrapping around the PU yarn-core 102.

Preferably, the conductive base layer 104B may include at least one graphene layer, which is similar to the outer graphene layer 104A in the sheath 104, although the number of graphene layers in each of the inner and outer graphene layers may be different. The conductive base layer 104B may maintain an electrical conductivity of the electromechanical sensor 100, in particular when the outer graphene layer 104A in the sheath may be further extended with a relatively high electrical resistance during operations.

Similar to the outer graphene layer 104A, the inner graphene layer 104B may also include an electrical resistance which is operable to change upon a change of a dimension of the elastic carrier 102 or the core, based on the existence of micro cracks along the graphene layers as discussed earlier.

Preferably, the buffer layer 104C may include gold and/or other metallic materials as disclosed above. The buffer layer 104C may maintain the electrical conductivity of the electromechanical sensor 100. More preferably, the metal layer 104C, sandwiched between the two graphene layers (104A and 104B), may act as a sliding medium to facilitate sliding movement of the sensing sheath 104 (or the outer graphene layer 104A) with respect to the conductive base layer 104B (or the inner graphene layer) and/or the elastic carrier 102, by reducing a friction between the sensing sheath 104 and the conductive base layer 104B. In addition, the slipping movement also allows the sensor 100, when under stress/strain applied, to adjust partial stress applied on the sensing sheath 104 during operation of the electromechanical sensor 100.

Additionally, the electromechanical sensor further comprises an encapsulation 106 arranged to protect the elastic carrier 102 and the sensing sheath 104. For example, the encapsulation 106 may be a polymer layer, such as PDMS layer, wrapping around therefore may protect the elastic carrier 102 and the sensing sheath 104. Other encapsulation material, which is preferably waterproof, biocompatible and/or non-toxic, may be used.

In the preferable embodiment as shown in FIGS. 1A and 1B, the PU yarn-based strain sensor 100 includes a PU yarn-core 102, multilayer GNSs/Au/GNSs-sheath 104, and PDMS wrapping layer 106, by using fabrication methods of Layer-by-Layer (LbL) assembling, sputtering, LbL assembling and dip-coating approach.

Without wishing to be bound by theory, all components may be rationally selected to fabricate flexible, stretchable and wearable PU yarn-based strain sensor showing high sensitivity, broad strain-sensing range, outstanding stability, and excellent waterproof property.

Firstly, PU yarn is lightweight and superelastic, may be chosen as the core material because of its intrinsic superior mechanical performance and good resistance to most chemicals. It is observable that both of the PU yarn and the resultant strain sensor can be stretched to around 500% until break, meaning that the multilayer sheath and PDMS wrapping layer have no apparent influence on the inherent outstanding mechanical property.

Secondly, the utilization of the highly conductive multilayer sheath structure GNSs/Au/GNSs enables the yarn strain sensor to possess good sensitivity as well as wide strain-sensing range. Advantageously, the inner GNSs layer may provide continuous conductive base layer to the non-conductive PU yarn and makes it conductive and enables variation in conductivity when the strain sensor is deformed; the interlayer Au film and outlayer GNSs may be included to afford it higher conductivity, while the Au film may also act as a sliding medium between the innerlayer and outlayer GNSs when stretching to broaden the strain-sensing range.

Thirdly, a thin PDMS film was used to wrap the multilayer GNSs/Au/GNSs-sheath. The outstanding biocompatibility and nontoxicity of the PDMS encapsulation layer enables the resultant strain sensor safer and more comfortable for wearing on human body, which may be important in wearable devices. Moreover, the hydrophobic PDMS wrapping layer can isolate the resultant strain sensor from external liquids such as rainwater and human sweat to improve the durability and lifetime of the PU yarn-based wearable devices. Meanwhile, the PDMS wrapping layer may also prevent the resultant strain sensor from damage when bearing common mechanical operations during fabrication and daily use such as stretching and bending, thus endowing the resultant strain sensor superior mechanical robustness.

Figure 2:
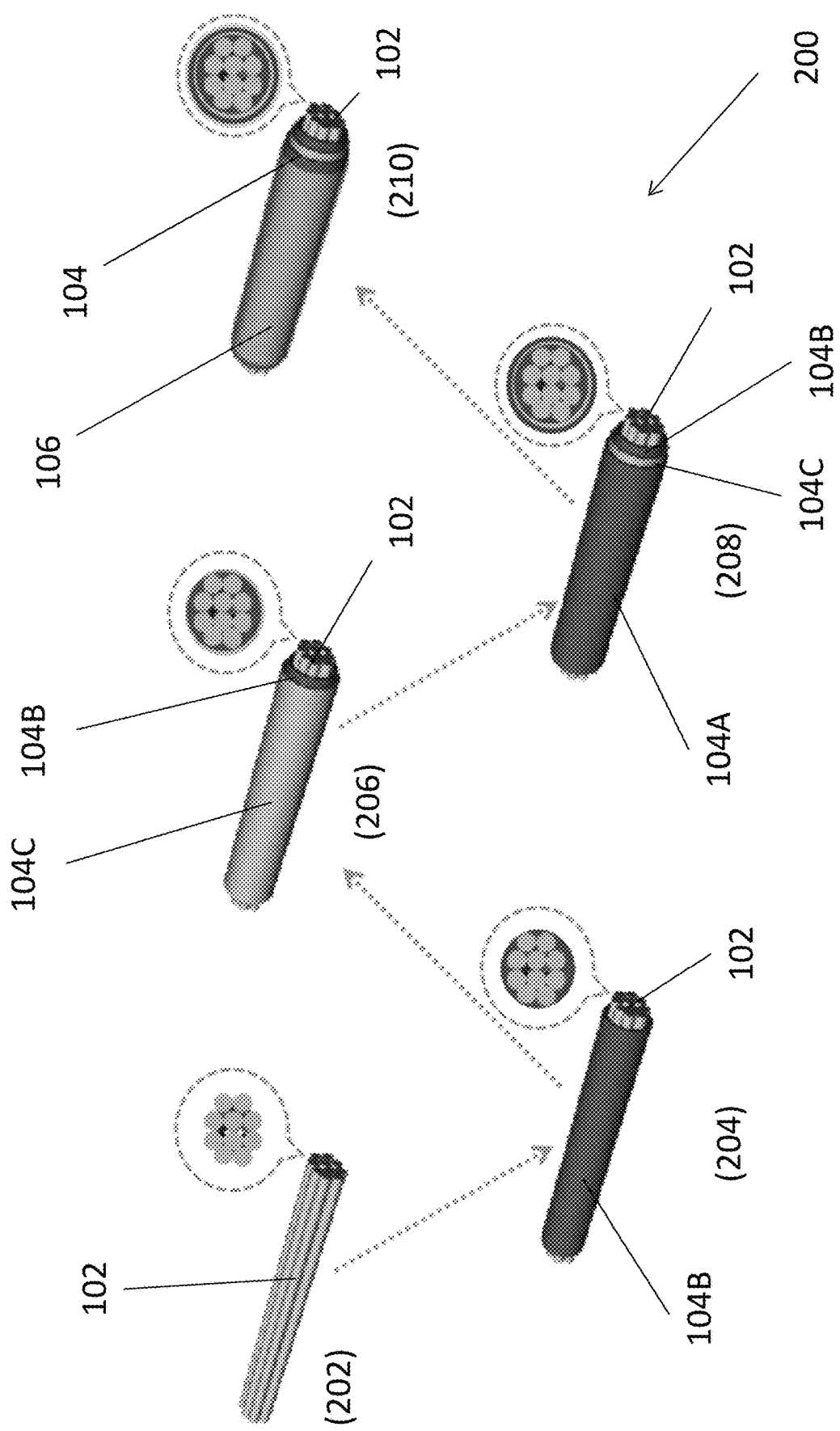
FIG. 2 is a flow diagram showing an example method of fabricating the electromechanical sensor of FIG. 1A.

With reference to FIG. 2, there is shown an example embodiment of a method 200 of producing an electromechanical sensor. The method comprising the step of providing a sensing sheath 104 on an elastic carrier 102 by coating an electrically resistive element on a surface of the elastic carrier 102; wherein the elastic carrier 102 is arranged to extend when subjected to an external mechanical load; wherein the sensing sheath 104 is at least partially around and along the elastic carrier 102; and wherein the electrically resistive element has a first electrical resistance operable to change upon a change of a dimension of the elastic carrier.

In addition, the method further comprises the step of providing at least one intermediate layers between the elastic carrier 102 and the sensing sheath 104, and encapsulating the sensing sheath 104 and the elastic carrier 102 by coating an encapsulation 106 on a surface of the sensing sheath 104.

The method starts with step 202, in which the PU yarn 102 may be pretreated by ultrosonication in ethanol and deionized (DI) water for 15 min successively. After dried in air under room temperature (25° C.), the PU yarn 102 may be then treated with oxygen plasma for 10 min to endow the surface of the PU yarn hydrophilicity and thus facilitating binding forces between the PU yarn 102 and graphene NSs 104.

PVA solution may be used to further improve the deposition of graphene on the PU core 102. By adding 0.5 g PVA powder into 100 mL DI water at 80° C. and then stirring for 10 min and ultrasonically agitating 30 min to dissolve it and obtain a 0.5 wt % PVA solution. The GNSs dispersion may then be prepared by dissolving 0.8 g GNSs and 0.4 g SLS (weight ratio of 2:1) into 100 mL DI water and then dispersing for 30 min via ultrasonication.

In step 204, a first layer of graphene 104B may be deposited on the PU core 102. The GNSs/PU yarn strain sensor structure may be prepared by employing a scalable and low-cost layer-by-layer (LbL) assembling method. In this process, a two-step method may be employed. Firstly, by dipping the oxygen plasma-pretreated PU yarn into PVA solution for 5 min, and then rinsed by DI water and dried in air under room temperature. Then, by immersing the PVA-coated PU yarn into graphene dispersion for 5 min, and then the coated PU yarn may be washed by DI water and air dried under room temperature. By repeating the two-step procedure 12 times to obtain the GNSs/PU yarn strain sensor.

In step 206, a sputtering system (such as QUORUM Q150TS Sputtering Coater) conducting under vacuum at 20 mA for 40 s may be used to coat a thin layer of Au film 104C onto the GNSs/PU yarn strain sensor for preparing Au/GNSs/PU yarn strain sensor structure.

In step 208, another layer of graphene 104A may be coated on the AU layer 104C, by repeating the above mentioned two-step LbL assembling process 6 times to fabricate GNSs/Au/GNSs/PU yarn strain sensor.

In step 210, the entire sensor structure may be encapsulated using PDMS 106. Firstly, PDMS base and curing agent (weight ratio: 10:1) may be dissolved in solvent tetrahydrofuran (THF) (m:V=1 g:20 mL) and stirred for 10 min at 25° C. to prepare a homogeneous solution. Secondly, dipping the as-fabricated GNSs/Au/GNSs/PU yarn strain sensor into the PDMS solution for 5 s and then taking it out immediately to obtain a thin PDMS film 106 wrapped yarn strain sensor 100. Then, the PDMS wrapped yarn strain sensor 100 may be placed in an oven under 60° C. for 2 h for drying. Wrapping the PDMS layer on the GNSs/Au/GNSs/PU yarn may prevent the coating sheath 104 from peeling off and improve the waterproofness, thereby enhancing its durability and water repellency during work.

Finally, the electrodes (not shown) may be provided by fastening the resulted strain sensors 100 with copper wire gently, and it is found that this would not affect their initial resistances.

Example materials that may be used for fabricating an electromechanical sensor are as follows, although other alternatives of each of these may be used as appreciated by a skilled person in the art.

Superelastic PU yarn—a multifilament yarn which constituted by ten monofilaments (diameter of monofilament: 40 μm).

Graphene nanosheets (GNSs)—(TNPRGO, purity: >98%, scale: 2-10 μm, thickness: 1-3 nm, number of layers: <3).

Polyvinyl alcohol (PVA)—analytical grade, (MW: 89,000-98,000).

Two-component kit polydimethylsiloxane (PDMS, Sylgard® 184) containing a PDMS base and a curing agent may be used.

Furthermore, the electromechanical sensor 100 may be further applied in wearable devices, by weaving a fabric component with the elastic carrier 102 coated with the electrically resistive element, wherein the elastic carrier 102 includes one or more yarns or filaments. The inventors implemented two example wearable devices for experimental purpose.

In a first example embodiment of the testing device, there is provided a smart medical textile bandage for monitoring various human motions. In this example, strain-sensing textile bandages were prepared using a simple hand-sewing technique. The as-prepared PU yarn-based strain sensors were integrated into designated positions in commercial elastic textile bandages, retaining a straight configuration for enhanced linearity of the resultant strain-sensing textile bandages.

In a first example embodiment of the testing device, there is provided a smart glove for controlling hand robot. The strain sensors were sewn at each node of the five fingers. Together with measuring resistor $R_m$, this resistive sensor $R_{sensor}$ forms a voltage divider circuit. The sensed voltage $V_s$ is given by:

$$V_S = V_{CC}\left(\frac{R_m}{R_{sensor} + R_m}\right).$$

where $V_{CC}$ is 3.3 V. In order to better compensate and closely match the bending angle to provide uniform voltage readout across all five fingers, a non-inverting amplifier circuit is designed. The output signal $V_{out}$ is given by $$V_{out} = V_S\left(1 + \frac{R_g}{R_{in}}\right) - V_{off}$$

where $V_{off}$ is determined by tuning the offset resistor $R_{offset}$, $R_{in}$ is the input resistor to the inverting input of the operational amplifier, $R_g$ is the gain resistor. A commercial microcontroller (MBED LPC1768) may be used to acquire the $V_{out}$ of from each finger via analog-to-digital conversion (ADC) input ports. In the running program, the $V_{out}$ is first normalized and then linearly mapped to the rotation angle of its corresponding finger's servo motor.

In this example, the minimum and maximum normalized values may be reconfigured by pressing the three functional switches on the calibration circuit: Switch 1 for entering into calibration mode; Switch 2 for setting the minimum normalized values for all $V_{out}$ when the glove is fully closed; and Switch 3 for setting the maximum normalized values for all $V_{out}$ when the glove is fully opened. The microcontroller can be optionally connected to computer (via UART serial communication) that runs Robot Operating System (ROS) middleware in order to visualize the acquired voltage from each finger. As for the robotic hand, fingers movement are mechanically coupled to the rotation of servo motors that use Pulse Width Modulation (PWM) control signal.

Advantageously, the textile bandage may be used to monitor various human motions (phonation, pulse, finger bending, and walking) and the textile glove may be used to control a hand robot to demonstrate some gestures and catch some objects rapidly and precisely.

In the experiments, the surface morphologies of the as-prepared yarn strain sensors were captured by using field-emission scanning electron microscope (FEI Quanta 450 FEG SEM). Energy dispersive X-ray spectroscopy (EDS) mapping was conducted using an AZtech Energy X-Max 20 EDS system. The tensile properties of the pristine PU yarn and as-fabricated strain sensor were tested in according to ASTM D2653 standard and employed an Instron 5944 MicroTester. The pristine PU yarn and as-fabricated strain sensor were tested with a gauge length of 20 mm, a pretension force of 2 mN, and a crosshead speed of 100 mm/min. The electro-mechanical properties of the as-fabricated strain sensors were examined via combining a Materials Testing System (TINIUS OLSEN H50KT) with a multimeter (KEITHLEY DAQ6510) by varying the stretching and releasing at controlled cyclic testing.

In order to investigate the surface morphology change and element composition and distribution during the whole fabrication process, the surface and cross-section morphology were characterized by using FESEM.

Figure 3:
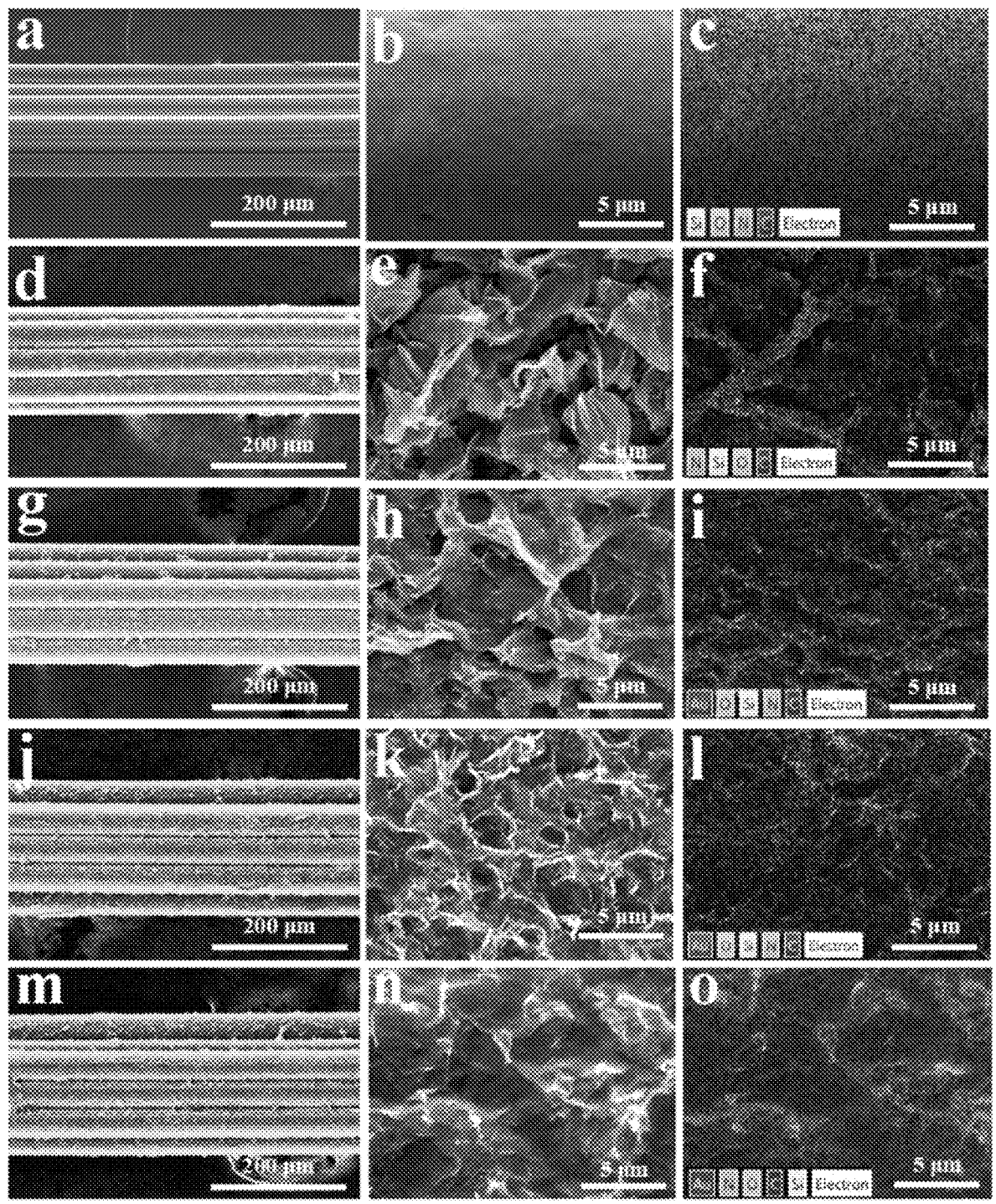
FIG. 3 are SEM images and EDS mapping of the electromechanical sensor fabricated using the process flow of FIG. 2, in which (a, b) SEM images and (c) EDS mapping of oxygen plasma-pretreated PU yarn; (d, e) SEM images and (f) EDS mapping of GNSs/PU yarn strain sensor; (g, h) SEM images and (i) EDS mapping of Au/GNSs/PU yarn strain sensor; (j, k) SEM images and (l) EDS mapping of GNSs/Au/GNSs/PU yarn strain sensor; and (m, n) SEM images and (o) EDS mapping of as-obtained PDMS-wrapped GNSs/Au/GNSs/PU yarn strain sensor.

With reference to FIG. 3, as shown in FIGS. 3a and 3b, the oxygen plasma-pretreated PU yarn which constituted by a group of monofilaments with average diameters of around 40 μm, demonstrating uniform and smooth surface morphology.

Meanwhile, referring to FIG. 3c, the intrinsic elements of the pristine PU yarn are well distributed as illustrated in EDS mapping. After coated with GNSs by LbL assembling, referring to FIGS. 3d and 3e, it is observable that the GNSs with size ranged from 2 to 10 μm are distributed on the surface of PU yarn uniformly, as well as the elemental distribution demonstrated in FIG. 3f.

Notably, the planar dimension of the GNSs plays a significant role in wrapping GNSs around the substrate PVA-coated PU yarn stably, closely, and evenly. Moreover, the non-covalent interactions including van der Waals forces, hydrogen bonding, and hydrophobic attraction [30] between the GNSs and the PVA coated on PU yarn further improved the bonding force, forming a stable conductive sheath on PU yarn with good electro-mechanical properties, and thus endowing the GNSs/PU yarn strain sensor outstanding electro-mechanical performance.

Similarly to GNSs/PU yarn strain sensor, with reference to FIGS. 3g to 3l, both of the Au/GNSs/PU yarn strain sensor and the GNSs/Au/GNSs/PU yarn strain sensor exhibit uniform surface morphology after successively deposited with thin Au film and another layer of GNSs by using sputtering and LbL assembling respectively, and elements contained in the bilayer-Au/GNSs and the multilayer-GNSs/Au/GNSs are all equally distributed.

Specifically, as shown in FIG. 3h, the very thin Au coating layer playing as the interlayer has no apparent effect on the structure of GNSs/PU yarn strain sensor. The uniform distribution on the GNSs in the EDS mapping is further shown in FIG. 3i. The outlayer-GNSs provides another continuous conductive layer and further improve the conductivity of the PU yarn-based strain sensor.

The surface morphology and EDS mapping of the PDMS-wrapped GNSs/Au/GNSs/PU yarn strain sensor are illustrated in FIGS. 3m to 3o. It may be observable that the surface becomes smoother and blurrier compared with the sample without PDMS coating, and PDMS is well filled in the spaces between different GNSs, thereby proving that the surface of GNSs/Au/GNSs/PU yarn strain sensor has been evenly encapsulated by PDMS film.

In some preferable embodiments, a portion of the encapsulation 106 infiltrates into cracks on the electrically resistive element on the sensing sheath 104, and the encapsulation 106, being a layer of elastic polymer, may also facilitate a retraction of the elastic carrier 102 upon a release of at least a portion of the external mechanical load.

After being cured, the PDMS layer 106 may also act as a glue to bind the multilayer sheath GNSs-Au-GNSs and core PU yarn 102 into a complete entity, which is anticipated to avoid the multilayer sheath 104 from peeling off and to afford the as-fabricated strain sensor excellent durability and mechanical robustness when undergoing long-term cyclic electro-mechanical testing.

The inventors have investigated the strain-sensing mechanism of the PU yarn-based core-sheath strain sensors. Considering the multilayer structure of the GNSs-Au-GNSs sheath, there are mainly three kinds of motion models that exist inside the strain-sensing sheath 104 during the stretching and releasing process. For example, (1) fracture of the lamellar structures, which relates to microcrack-propagation strain-sensing mechanism, (2) slippage of adjacent layers, which relates to slippage strain-sensing mechanism, and (3) infiltration of PDMS, which corresponds to infiltrating insulator PDMS into spaces and microcracks between GNSs.

Figure 4:
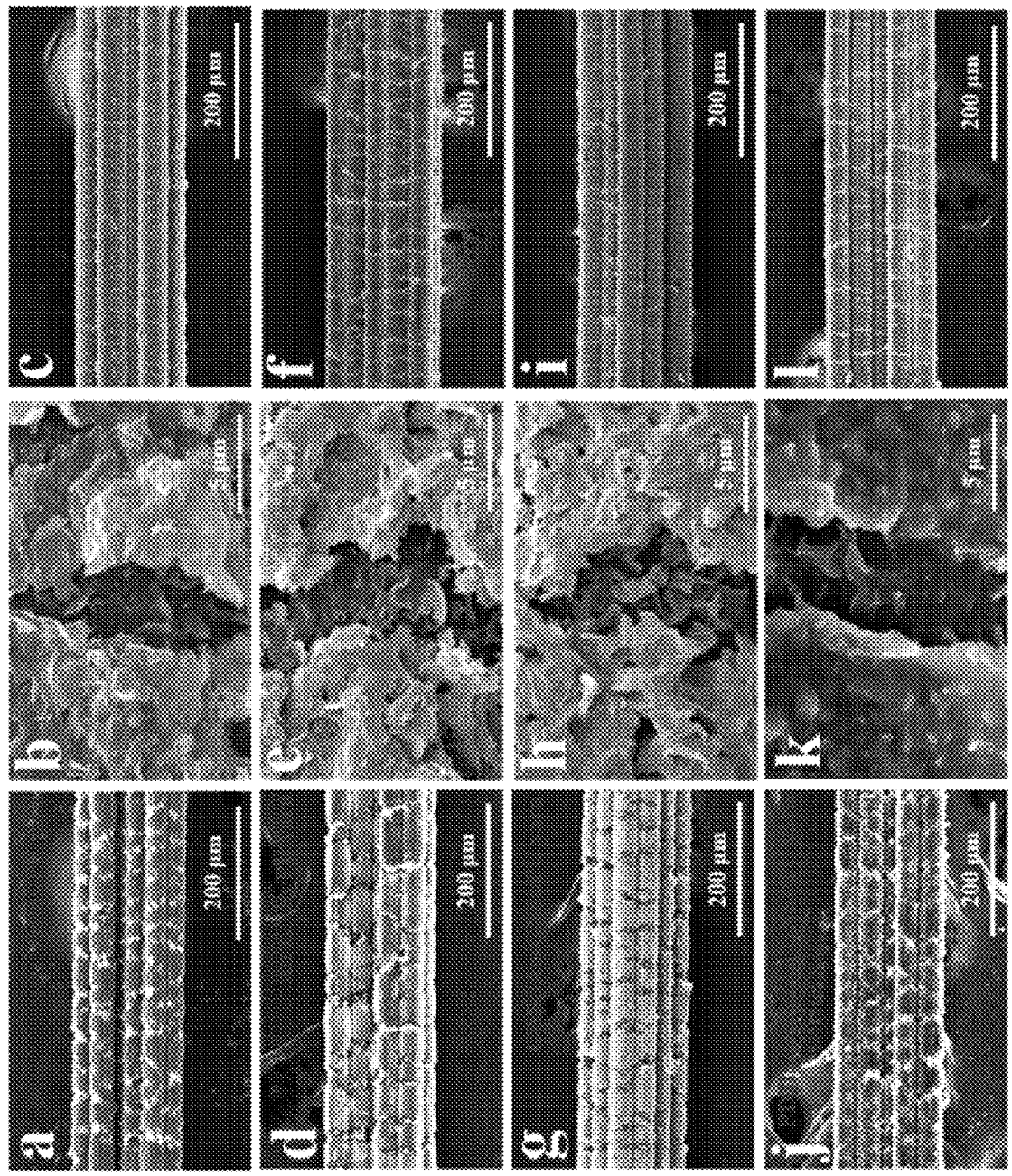
FIG. 4 are SEM images of GNSs/PU yarn strain sensor under (a, b) 50% strain, and (c) recovered state; SEM images of Au/GNSs/PU yarn strain sensor under: (d, e) 50% strain, and (f) recovered state; SEM images of GNSs/Au/GNSs/PU yarn strain sensor under: (g, h) 50% strain, and (i) recovered state; SEM images of PDMS wrapped GNSs/Au/GNSs/PU yarn strain sensor under: (j, k) 50% strain, and (l) recovered state.

In order to further understand the role of GNSs on the strain-sensing mechanism for the PU yarn-based strain sensors, the surface morphology of the as-fabricated strain sensors under stretching state are characterized by using FESEM. With reference to FIG. 4, it is observable that microcracks form and propagate in GNSs sheath, Au/GNSs sheath, GNSs/Au/GNSs sheath, and PDMS wrapped GNSs/Au/GNSs sheath uniformly under the applied strain. This represents that the relative resistance changes in the GNSs-based strain-sensing sheaths were all mainly manipulated by microcrack-propagation strain-sensing mechanism, thereby guaranteeing the excellent sensitivity and linearity for all of the samples demonstrated in FIG. 4.

AS discussed earlier, the interlayer Au film deposited on GNSs may provide a function of sliding between the inner and outer GNSs layers to decrease the friction force between adjacent GNSs. The slippage between adjacent GNSs layers inside the multilayer sheath could adjust partial stress applied on the strain-sensing sheath, and compress the friction and microcrack propagation to a certain degree, thus broadening the strain-sensing range of GNSs/Au/GNSs/PU yarn strain sensor.

As suggested by FESEM images illustrated in FIG. 4, it is clearly to observe that the density and crack size of microcracks in both GNSs sheath and Au/GNSs sheath are similar, that is to say that the surface of GNSs were not affected by the coating of interlayer thin Au film. After coated with the outlayer GNSs, the density and crack size of microcracks remain similar but the density of GNSs which filled in the microcrack was increased due to the compressed friction and microcrack propagation caused by the slippage of Au layer between the adjacent GNSs layers.

Similarly, compared with the multilayer GNSs/Au/GNSs, the microcrack density and crack size of the PDMS wrapped sheath have no obvious change, i.e., the PDMS wrapping layer left no effect on the microcrack density and crack size. It is notable that under stretching state, PDMS wrapping layer, which acts as a protecting and waterproof layer to improve durability and water repellency, had infiltrated into the spaces and openings between GNSs and thus increasing the resistance change during the stretching process. After released, with reference to FIGS. 4c, 4f, 4i and 4l, all of the strain-sensing sheaths can be recovered to initial uniform surface in which some small wrinkles can still be observed.

The strain-sensing performance of the PU yarn-based strain sensors was also examined by measuring their relative resistance change ($(R-R_0)/R_0$, where $R_0$ and R are the initial resistance before stretching and the final resistance under applied strain, respectively) under specific applied strain. All of the as-fabricated strain sensors were fixed on the material tester by a fixture to monitor the relative resistance change in sync with deformation. The electrical resistance change which resulted by the opening-closing of microcracks in the strain-sensing sheath during the stretching/releasing process is deemed as the strain-sensing mechanism. The relative resistance changes of the resultant PU yarn-based strain sensors have been evaluated.

Figure 5A:
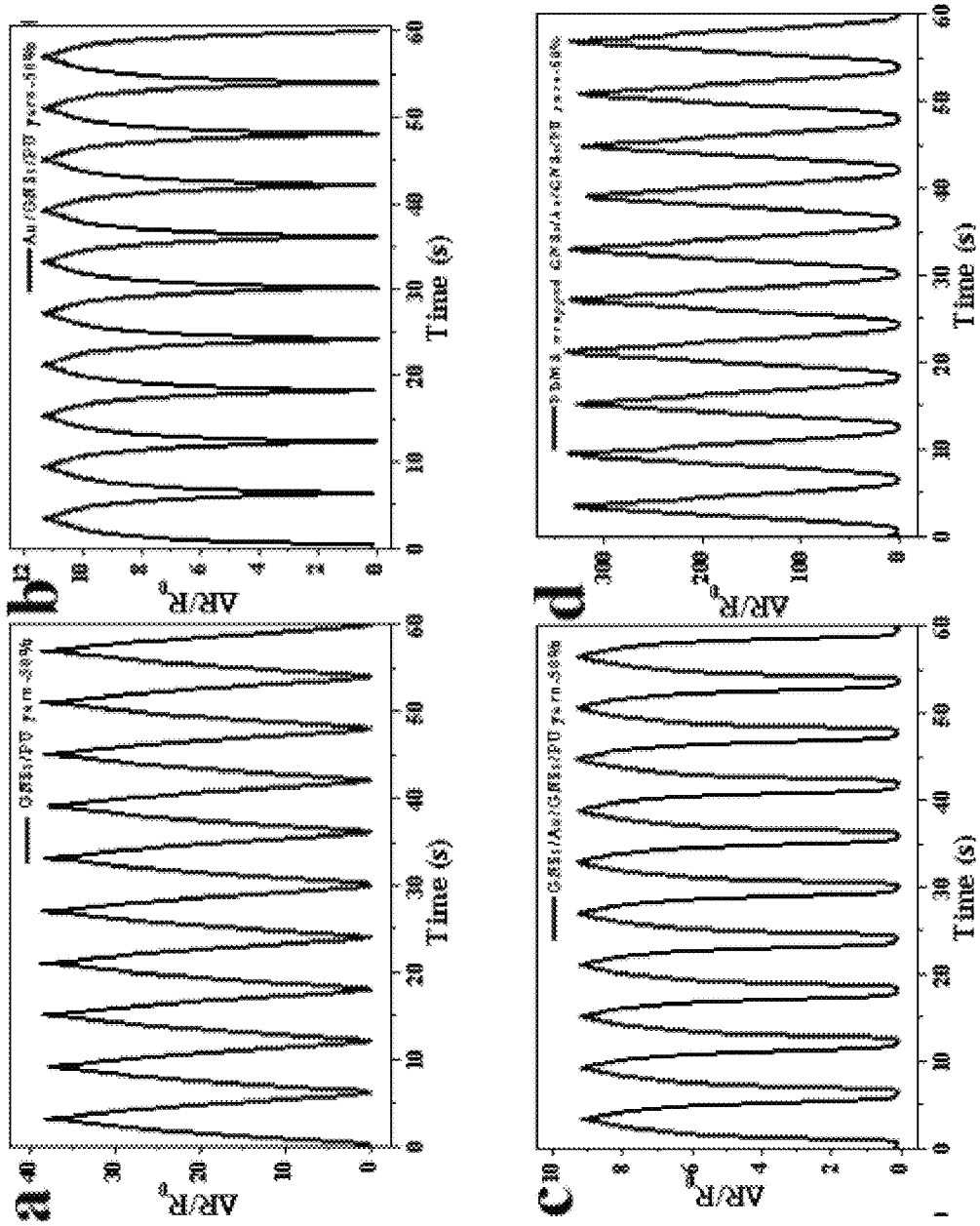
FIGS. 5A to 5C are plots showing resistance-time relationships under ten stretching/releasing cycles with an applied strain of 50%: (a) GNSs/PU yarn, (b) Au/GNSs/PU yarn, (c) GNSs/Au/GNSs/PU yarn, (d) PDMS wrapped GNSs/Au/GNSs/PU yarn; Resistance-strain relationships with an applied strain of 50%: (e) GNSs/PU yarn, (f) Au/GNSs/PU yarn, (g) GNSs/Au/GNSs/PU yarn, (h) PDMS wrapped GNSs/Au/GNSs/PU yarn; (i) Relative resistance change of PDMS wrapped GNSs/Au/GNSs/PU yarn during 10000 stretching/releasing cycles with an applied strain of 50%, inset figure records the detailed relative resistance change curves between 2000th and 2020th stretching/releasing cycle; and three typical relative resistance change curves of the 1st, 5000th, and 10000th stretching/releasing cycle.
Figure 5B:
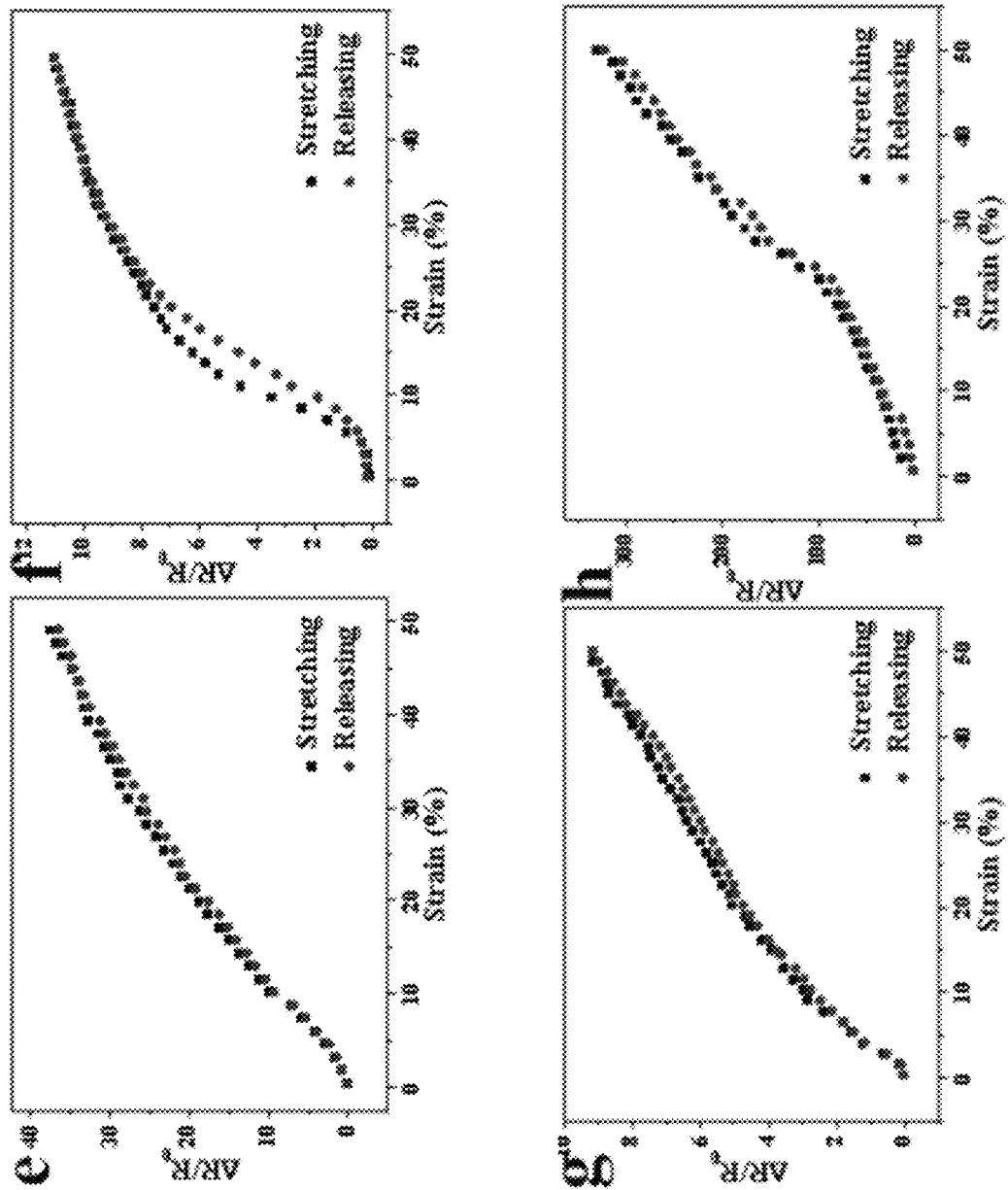
Figure 5C:
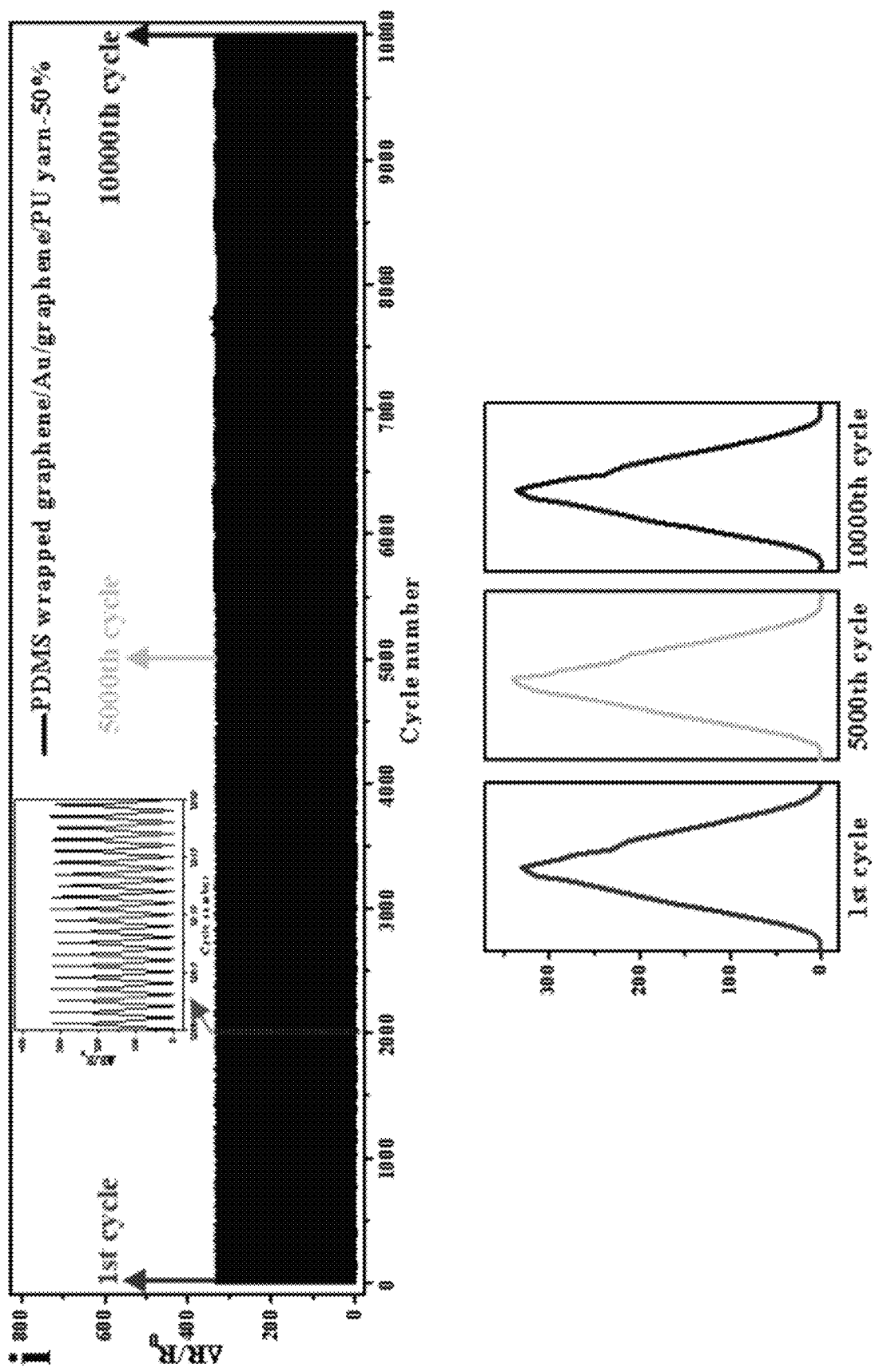

Wither reference to FIGS. 5A to 5C, during stretching process, all of the samples exhibited a sharp and linear increase in relative resistance change with the increasing applied strain. When released, the samples almost recovered to their original lengths because of the intrinsic mechanical property of the elastic PU yarn-core 102 and the PDMS wrapping layer. Therefore, the relative resistance change resulted from the closing of microcracks decreased with the releasing process linearly. Specific to say, the larger the external strain applied, the larger the elongation of the samples, followed by increased numbers and propagation of microcracks, resulting to increased relative resistance of the resultant PU yarn-based strain sensors. From the foregoing analysis, the relative resistance of the as-fabricated coaxial-structured strain sensor is correlated with strain positively, which mainly varied with the number and sizes of microcracks generated in the strain-sensing sheath 104.

In order to define and compare the electro-mechanical properties, gauge factor (GF), which is generally defined as $GF=((R-R_0)/R_0)/\varepsilon$ (where $\varepsilon$ stands for the applied strain), is utilized to evaluate the sensitivity. The GF value may be obtained according to the relationship above, as shown in FIG. 5A-a, the GNSs/PU yarn strain sensor roughly exhibited an outstanding GF of 76.68 for the strain range within 50%. Due to the microcrack-propagation mechanism in the inner GNSs layer, referring to FIG. 5B-e, the good sensitivity was coupled with a high linearity of 0.984.

After coated with a thin Au film, referring to FIG. 5A-b, a decreased GF of 22.71 within 50%, as well as a GF of 23.96 along with an enlarged strain-sensing range (75%) were observed because of the reduced relative resistance change caused by the improving of electrical conductivity. However, the linearity of the relative resistance changes over strain within 50% was slightly affected by the deposition of the thin Au film, referring to FIG. 5B-f, decreased to 0.933.

Similarly, referring to FIG. 5A-c and FIG. 5B-g, the GNSs/Au/GNSs/PU yarn strain sensor also showed a relative small GF of 18.33 and a linearity of 0.979 within 50% and 19.55 for an enlarged strain-sensing range of 75%. Finally, referring to FIG. 5A-d and FIG. 5B-h, the PDMS wrapped strain sensor shows an ultrahigh GF of 661.59 and a linearity of 0.975 within 50% and a GF of 668.33 in the working range of 50%-75%, thereby demonstrating the superior sensitivity and broad strain-sensing range of the resultant strain sensor.

With reference to FIG. 5C, there is shown plots illustrating the cyclic test of the relative resistance change of the resultant strain sensor during 10000 stretching/releasing cycles with an applied strain of 50% at stretch/release rate of 100 mm/min. The relative resistance changes at the baseline and the peak remain stable during the process, which can further be confirmed by the relative resistance change curves of the 2001st-2020th (as shown in the inset figure), the 1st, 5000th, and 10000th releasing/stretching cycles.

It may be observable that during 10000 stretching/releasing cycles, the strain sensor still maintained its original electro-mechanical properties, owing to the outstanding mechanical properties of the materials used in the strain sensor including the PU yarn core, the multilayer sheath, and the PDMS wrapping layer.

For wearable applications, apart from the outstanding flexibility and stretchability, excellent waterproofness is also critical and required to against moist environment such as sweat and rain. Herein, the encapsulation of the hydrophobic PDMS layer, which not only endow the PU yarn-based strain sensor with good water repellency, also effective maintain the flexibility of the PU yarn-based strain sensor.

Figure 6:
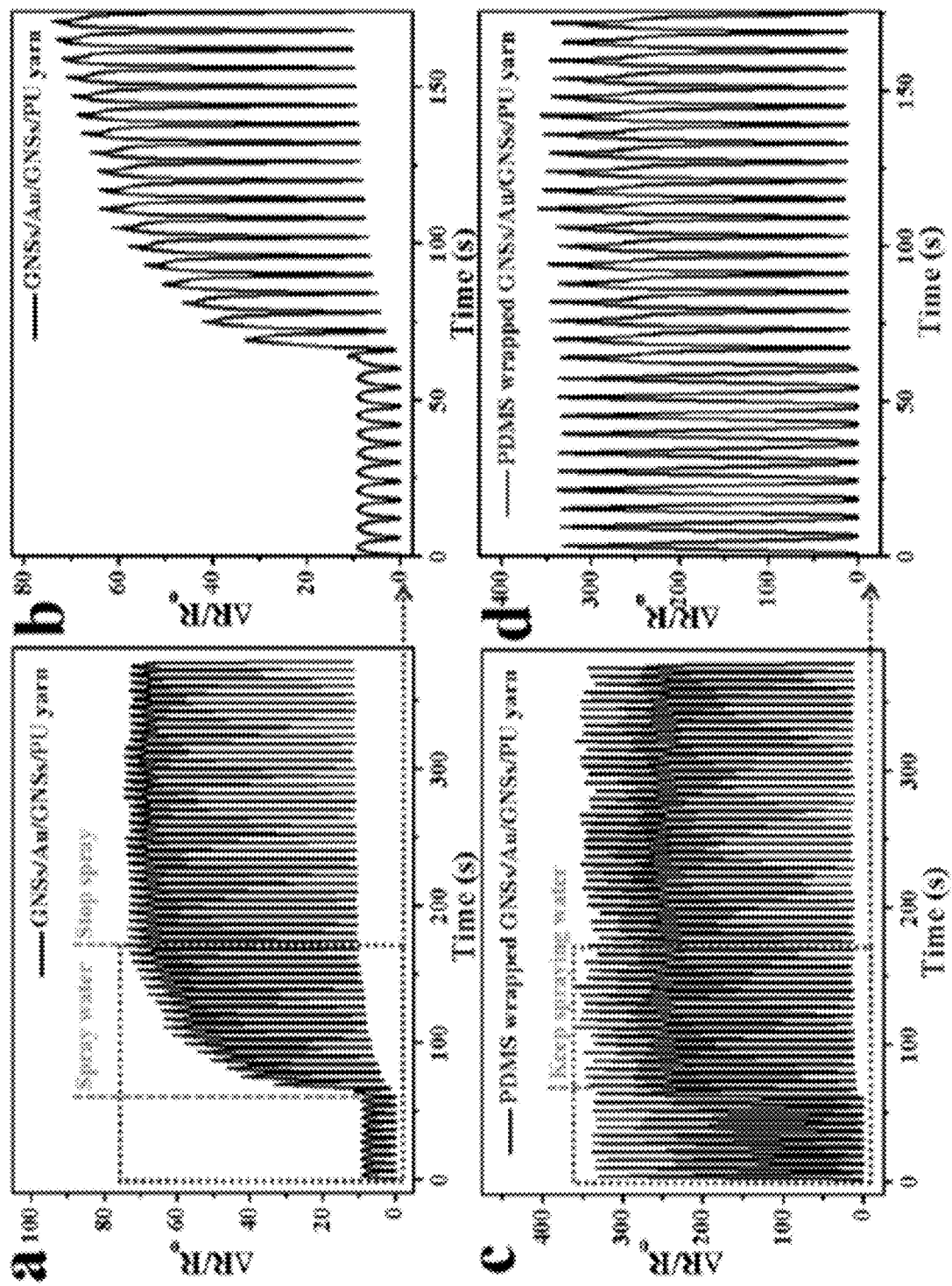
FIG. 6 are plots showing resistance-time relationships of (a, b) GNSs/Au/GNSs/PU yarn strain sensor, (c, d) PDMS wrapped GNSs/Au/GNSs/PU yarn strain sensor with an applied strain of 50% under water spray.

In order to prove the excellent waterproofness afforded by the hydrophobic PDMS layer, with reference to FIG. 6, the electro-mechanical properties of the GNSs/Au/GNSs/PU yarn strain sensor and PDMS wrapped GNSs/Au/GNSs/PU yarn strain sensor with water spray were tested.

For the strain sensor without PDMS wrapping, once sprayed water on the strain sensor during working state, it was observed that a remarkable jump of the relative resistance changes at the positions of both the baseline and the peak until stopped spray water. In detail, the relative resistance change values at baseline and peak gradually varied from 0 and 9.17 to around 10 and 70, respectively, while after stopped spray water, they did not change further. However, the PDMS wrapped strain sensor illustrates a totally different phenomenon whereby the relative resistance change values were only slightly affected by the water even under continuously spraying of water during the whole working process. This suggests that the thin PDMS wrapping film enables the resultant strain sensor waterproof and workable even in moist environment.

Advantageously, wing to the high flexibility and stretchability, outstanding sensitivity, broad strain-sensing range, excellent durability and waterproofness, the PU yarn-based sensor may be used in different applications in wearable and textile electronics.

For example, the PU yarn-based strain sensor may be integrated into textiles and makes it applicable for monitoring full-range human motions including tiny motions (such as pulse and phonation) and large-scale motions (such as finger bending and walking). For the human motion monitoring experiments, the abovementioned strain sensor-based medical textile bandages were tested, which were worn on wrist, throat, finger and knee via using a simple hand-sewing method.

Figure 7:
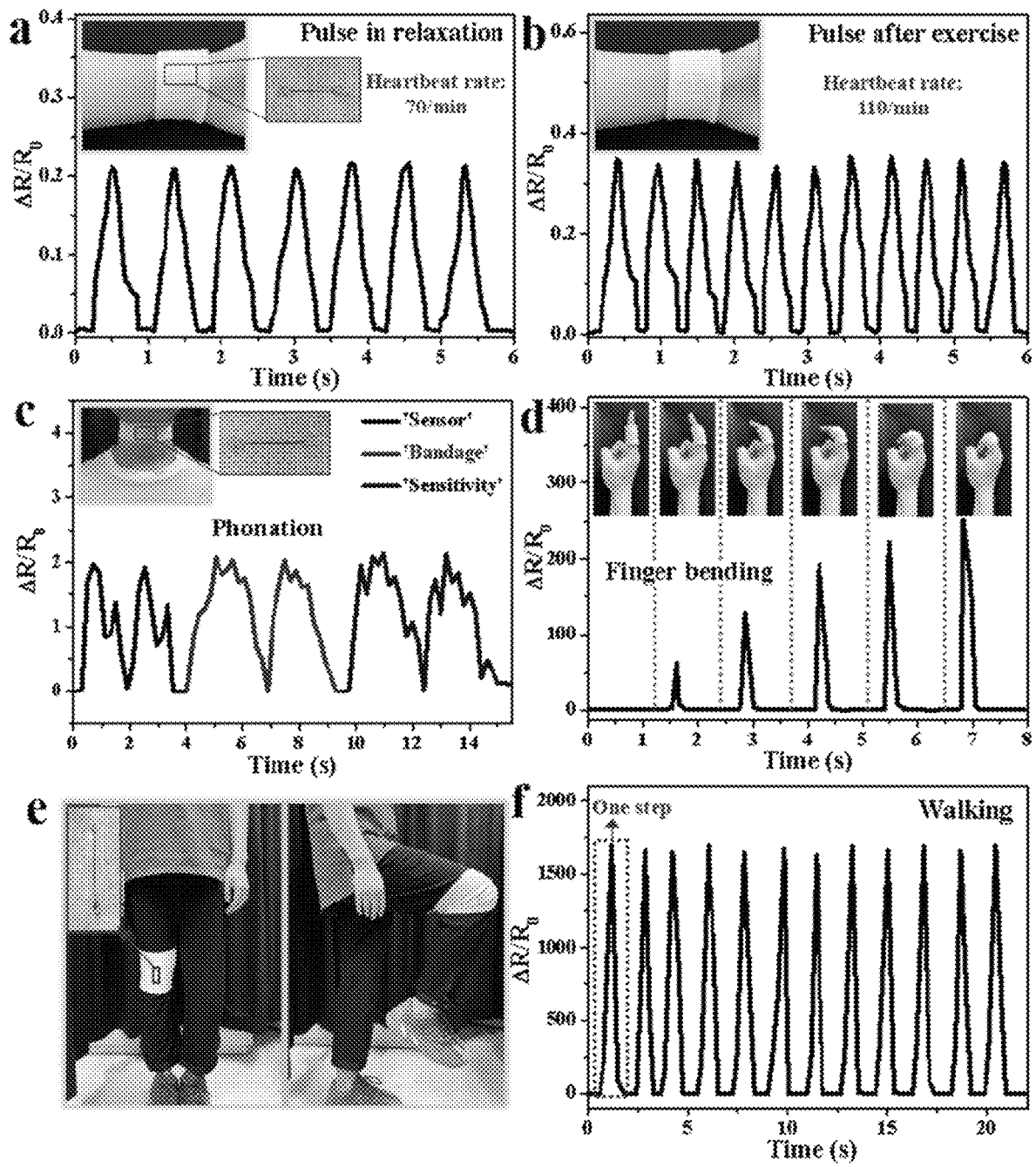
FIG. 7 are plots and images showing an example human motion monitoring experiment by using the strain sensor-based medical textile bandage, in relation to: relative resistance changes of (a) pulse in relaxation state, (b) pulse in relaxation state; Inset: photographs of smart bandage worn by a wrist; (c) relative resistance changes of phonations of 'sensor', 'bandage', and 'sensitivity' respectively; Inset: photograph of smart bandage worn by a neck; (d) relative resistance changes of finger bending to different degrees; Inset: photographs of smart bandage worn by a finger and bent to different degrees; (e) photographs of smart bandage worn by a leg and (f) relative resistance changes of walking.

With reference to FIGS. 7a and 7b, the strain sensor-based medical textile bandage was mounted on a wrist to monitor the waveforms of human pulse in two different states: (1) in relaxation state and (2) after exercise state. Regular relative resistance change curves over time can be clearly observed both in relaxation and after exercise states, however, two different frequencies of 7 and 11 heartbeats in 6 s (heartbeat rates of around 70/min and 110/min respectively) were demonstrated in two states respectively, which are reasonable heartbeat rates for a human without any cardiac diseases.

In addition, with reference to FIG. 7c, the strain sensor-based textile bandage can also be fixed onto the throat to distinguish diverse phonations by recording the relative resistance change curves over time. Several typical, clear and repeatable response signal patterns may be observed when the wearer spoke various polysyllabic words, including 'sensor', 'bandage', and 'sensitivity'. On the other hand, due to the high sensitivity (GF>600) in the strain-sensing range of 0-75%, the strain sensor-based medical textile bandage is able to detect human joint motions, which require larger deformation (up to or higher than 50%) compared with the foregoing subtle motions.

With reference to FIG. 7d, the strain sensor-based medical textile bandage was attached on a finger joint to monitor bending motions under different degrees and relaxing motions, the motions can be tracked by recording the relative resistance changes timely and precisely. Moreover, the strain sensor-based medical textile bandage can also be employed to monitor vigorous motions effectively while the wearer walked.

In addition to the detection of various human motions, the PU yarn-based strain sensor may be used as wearable sensor platform to be utilized for human motion interfaces (HMIs) by sewing the PU yarn-based strain sensors onto the nodes of five fingers of a textile glove, as discussed earlier and with reference to FIG. 8a. This engineering application may treat the strain sensor as a variable resistor in a typical analog electrical circuit. Bending degrees of each finger were tracked in continuous change of relative resistance, resulting in distinguishable response without any considerable interference between sensors.

Figure 8:
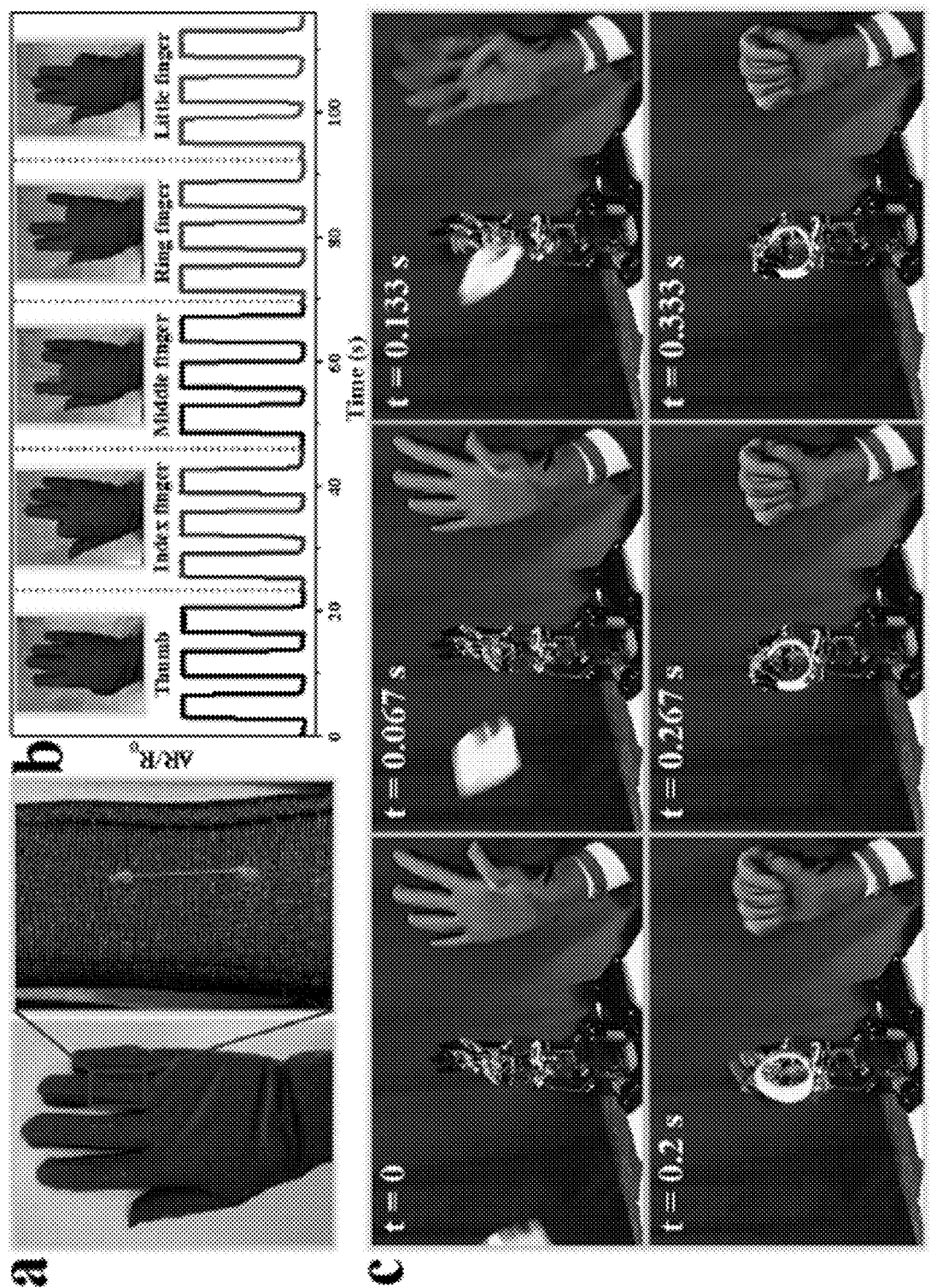
FIG. 8 are plots and images showing an example smart glove with PU yarn-based strain sensors on the finger nodes; in relation to: (a) photographs showing the smart glove with PU yarn-based strain sensors on the finger nodes; (b) resistive responses of the PU yarn-based strain sensors on the finger nodes of the smart glove for fully bent; and (c) photographs of a hand robot-catching process controlled by the smart glove.

Referring to FIG. 8b, this repeatable result forms the basis to integrate with a control circuit in order to map the finger movement angle into the finger movement of a robotic hand. Each strain sensor in the glove is connected to its signal conditioning circuit before voltage signal acquisition by a microcontroller. In the running program, the acquired voltage is normalized and then linearly mapped to the corresponding output angle of servo motor that is mechanically coupled to each finger of the robotic hand.

Settings for calibration of this HMI may be provided in order to closely match the unique hand shape and finger movement of each personal wearer. As a result, the response of the robotic hand is real time (~10 ms) when the glove receives finger movements.

In one example, the motions of this HMI platform in which diverse gestures of the hand robot can be real-time controlled by the same gestures of the smart glove successfully.

For further application, the sensor may catch a thrown fast-moving copper foil tape in blink rate referring to FIG. 8c, to hold still object, and grasp a moving toy rapidly, proving a real-time, instant eye-to-glove-to-robot control action in some other possible applications.

These embodiment may be advantageous in that, a highly flexible, stretchable, sensitive and waterproof strain sensor may be fabricated by employing flexible and stretchable PU yarn as the core material, the multilayer GNSs/Au/GNSs as the sheath material, and the PDMS film as the encapsulation layer via successively using LbL assembling, sputtering, LbL assembling, and dip-coating approach.

In addition to exhibiting outstanding flexibility, stretchability, wearability, and mechanical stability, the resultant strain sensor also demonstrated high sensitivity (GF: 661.59), wide strain-sensing range (0-75%), outstanding durability over 10000 stretching/releasing cycles, and superior waterproofness. More remarkably, the as-fabricated strain sensor can be readily and damage-free integrated onto textiles such as textile bandage and textile glove via simply hand-sewing method to prepare textile electronics.

Advantageously, the resultant textile electronics exhibited excellent capacity may be used for monitoring full-range human motions and manipulating hand robot to move, catch, hold and grasp some objects. On the basis of the superior and comprehensive performance, the PU yarn-based strain sensor may be used in textile electronics, wearable electronics, and biomedical electronics which used for healthcare-related applications such as disease diagnosis, preventive health-care, and rehabilitation care and robot controlling-related applications.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electromechanical sensor comprising:
   an elastic carrier arranged to extend when subjected to an external mechanical load;
   a sensing sheath arranged at least partially around and along the elastic carrier;
   wherein the sensing sheath includes an electrically resistive element having a first electrical resistance operable to change upon a change of a dimension of the elastic carrier; the electrically resistive element comprising an electrical conductive material and a plurality of cracks distributed along the electrical conductive material; wherein the plurality of cracks are operable between an opening state and a closing state.

2. The electromechanical sensor in accordance with claim 1, wherein a change of the electrical resistance represent mechanical strain subjected by the electromechanical sensor.

3. The electromechanical sensor in accordance with claim 1, wherein the elastic carrier includes an elongated shape.

4. The electromechanical sensor in accordance with claim 3, wherein the elastic carrier includes one or more yarns or filaments.

5. The electromechanical sensor in accordance with claim 3, wherein the elastic carrier is further arrange to retract upon a release of at least a portion of the external mechanical load.

6. The electromechanical sensor in accordance with claim 1, wherein the elastic carrier includes a first polymer.

7. The electromechanical sensor in accordance with claim 6, wherein the elastic carrier includes polyurethane.

8. The electromechanical sensor in accordance with claim 1, wherein the elastic carrier is an electrical insulator.

9. The electromechanical sensor in accordance with claim 1, wherein when the elastic carrier extends with an increasing of the external mechanical load subjected by the elastic carrier, the number of cracks operating in the opening state increases, thereby increasing the first electrical resistance of the electrically resistive element.

10. The electromechanical sensor in accordance with claim 1, wherein the electrically resistive element includes graphene.

11. The electromechanical sensor in accordance with claim 10, wherein the electrically resistive element includes multiple layers of graphene.

12. An electromechanical sensor comprising:
   an elastic carrier arranged to extend when subjected to an external mechanical load;
   a sensing sheath arranged at least partially around and along the elastic carrier; and
   at least one intermediate layers disposed between the elastic carrier and the sensing sheath;
   wherein the sensing sheath includes an electrically resistive element having a first electrical resistance operable to change upon a change of a dimension of the elastic carrier; the at least one intermediate layers comprising a conductive base layer arranged to maintain an electrical conductivity of the electromechanical sensor and a buffer layer disposed between the conductive base layer and the sensing sheath; the conductive base layer including a second electrical resistance operable to change upon a change of a dimension of the elastic carrier.

13. The electromechanical sensor in accordance with claim 12, wherein the conductive base layer includes at least one layer of graphene.

14. The electromechanical sensor in accordance with claim 12, wherein the buffer layer is arranged to facilitate sliding movement of the sensing sheath with respect to the conductive base layer and/or the elastic carrier.

15. The electromechanical sensor in accordance with claim 14, wherein the buffer layer is arranged to reduce a friction between the sensing sheath and the conductive base layer, and/or to adjust partial stress applied on the sensing sheath during operation of the electromechanical sensor.

16. The electromechanical sensor in accordance with claim 12, wherein the buffer layer is arranged to maintain the electrical conductivity of the electromechanical sensor.

17. The electromechanical sensor in accordance with claim 12, wherein the buffer layer includes gold.

18. An electromechanical sensor comprising:
an elastic carrier arranged to extend when subjected to an external mechanical load;
a sensing sheath arranged at least partially around and along the elastic carrier;
wherein the sensing sheath includes an electrically resistive element having a first electrical resistance operable to change upon a change of a dimension of the elastic carrier; the electromechanical sensor further comprising an encapsulation arranged to protect the elastic carrier and the sensing sheath; the encapsulation being substantially biocompatible and includes polydimethylsiloxane.

19. The electromechanical sensor in accordance with claim 18, wherein the encapsulation is substantially waterproof.

20. The electromechanical sensor in accordance with claim 18, wherein the encapsulation includes a second polymer.

21. The electromechanical sensor in accordance with claim 18, wherein a portion of the encapsulation infiltrates into a plurality of cracks on the electrically resistive element on the sensing sheath.

22. The electromechanical sensor in accordance with claim 18, wherein the encapsulation is further arrange to facilitate a retraction of the elastic carrier upon a release of at least a portion of the external mechanical load.

23. A wearable electronic device comprising the electromechanical sensor in accordance with claim 4, wherein the electromechanical sensor forms a portion of a fabric component of the wearable electronic device.

24. A method of producing a electromechanical sensor, comprising the step of coating a conductive base layer on the elastic carrier wherein the conductive base layer is arranged to maintain an electrical conductivity of the electromechanical sensor; the step of providing a sensing sheath on an elastic carrier by coating an electrically resistive element on a surface of the elastic carrier, and the step of providing at least one intermediate layers between the elastic carrier and the sensing sheath; wherein the elastic carrier is arranged to extend when subjected to an external mechanical load; wherein the sensing sheath is at least partially around and along the elastic carrier; and wherein the electrically resistive element has a first electrical resistance operable to change upon a change of a dimension of the elastic carrier.

25. The method of producing an electromechanical sensor in accordance with claim 24, wherein the step of coating the electrically resistive element on the surface of the elastic carrier includes immersing the elastic carrier into a graphene dispersion for a predetermined period of time.

26. The method of producing an electromechanical sensor in accordance with claim 25, wherein the elastic carrier includes polyurethane, and the elastic carrier is coated with polyvinyl alcohol prior to the coating of the electrically resistive element thereon.

27. The method of producing an electromechanical sensor in accordance with claim 25, further comprising the steps of repeating the step of immersing the elastic carrier into the graphene dispersion after air drying of the graphene coatings to obtain multiple layers of graphene coatings in the sensing sheath.

28. The method of producing an electromechanical sensor in accordance with claim 24, wherein the step of coating the conductive base layer on the elastic carrier includes immersing the elastic carrier into a graphene dispersion for a predetermined period of time, and optionally repeating the step of immersing the elastic carrier into the graphene dispersion after air drying of the graphene coatings to obtain multiple layers of graphene coatings in the conductive base layer.

29. The method of producing an electromechanical sensor in accordance with claim 24, further comprising the step of coating a buffer layer on the conductive base layer, wherein the buffer layer is arranged to facilitate sliding movement of the sensing sheath with respect to the conductive base layer and/or the elastic carrier.

30. The method of producing an electromechanical sensor in accordance with claim 29, wherein the step of coating a buffer layer on the conductive base layer includes sputtering gold on a surface of the conductive base layer.

31. A method of producing an eletromechanical sensor, comprising the step of providing a sensing sheath on an elastic carrier by coating an electrically resistive element on a surface of the elastic carrier, and the step of encapsulating the sensing sheath and the elastic carrier by coating an encapsulation on a surface of the sensing sheath; wherein the elastic carrier is arranged to extend when subjected to an external mechanical load; wherein the sensing sheath is at least partially around and along the elastic carrier; and wherein the electrically resistive element has a first electrical resistance operable to change upon a change of a dimension of the elastic carrier, wherein the step of coating the encapsulation on the surface of the sensing sheath includes the step of dipping the elastic carrier coated with the electrically resistive element in PDMS solution for a predetermined period of time.

32. The method of producing an electromechanical sensor in accordance with claim 24, further comprising the step of weaving a fabric component with the elastic carrier coated with the electrically resistive element, wherein the elastic carrier includes one or more yarns or filaments.

* * * * *